United States Patent [19]

Regnier

[11] 4,263,935
[45] Apr. 28, 1981

[54] PRESSURE-REGULATING VALVE WITH AUTOMATIC RELEASE

[75] Inventor: Jean Regnier, Manosque, France

[73] Assignee: Commissariat A L'Energie Atomique, Paris, France

[21] Appl. No.: 27,603

[22] Filed: Apr. 5, 1979

[30] Foreign Application Priority Data

Apr. 14, 1978 [FR] France .................. 78 11035

[51] Int. Cl.³ .................................. F16K 17/02
[52] U.S. Cl. ........................... 137/467; 137/522
[58] Field of Search ............... 137/522, 523, 467; 251/82, 63, 63.4, 63.5, 297; 137/528, 529

[56] References Cited

U.S. PATENT DOCUMENTS

| | | | |
|---|---|---|---|
| 1,710,055 | 4/1929 | Grant | 251/63.4 X |
| 1,861,742 | 6/1932 | Hand | 251/63.5 X |
| 2,847,182 | 8/1958 | Mancusi, Jr. | 251/297 X |
| 3,409,037 | 11/1968 | Nelson | 137/529 X |
| 3,651,829 | 3/1972 | Frantz | 137/522 X |

FOREIGN PATENT DOCUMENTS 1108577 1/1956 France .

*Primary Examiner*—William R. Cline
*Attorney, Agent, or Firm*—Cushman, Darby & Cushman

[57] ABSTRACT

A valve disc is capable of moving between a closed position in which it seals-off an opening formed in an enclosure and an open position in which it is withdrawn from the opening. The valve disc is maintained in its closed position when the pressure within the enclosure is below a predetermined value by means of back-pressure exerted by a pneumatic jack. Coupling means are provided for disconnecting the jack from the valve disc in the event of a fast pressure rise within the enclosure.

6 Claims, 1 Drawing Figure

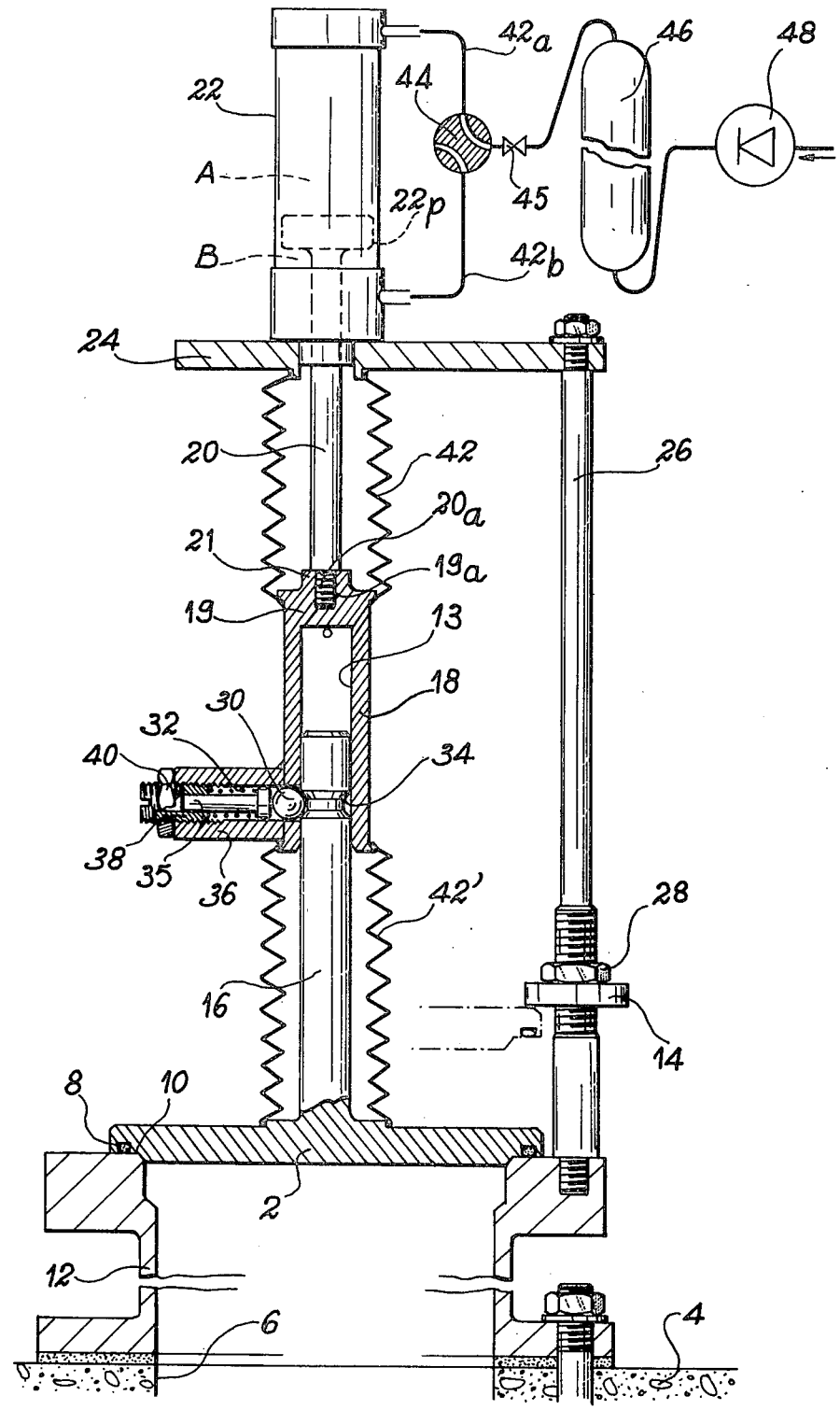

PRESSURE-REGULATING VALVE WITH AUTOMATIC RELEASE

BACKGROUND AND SUMMARY OF THE INVENTION

This invention relates to a regulating valve with automatic release for regulating and limiting to a given value the pressure existing within a leak-tight pressure containment vessel, hereinafter designated as an enclosure.

In more exact terms, the invention relates to a regulating valve of the type comprising a moving element for effecting leak-tight closure of an opening formed in an enclosure by cooperating with a valve seating which forms part of said enclosure. One of the faces of said moving element is in contact with the enclosure fluid whilst a force is applied to the other face, said force being intended to balance a given pressure of the fluid corresponding to a threshold value which must not be exceeded.

It is pointed out that, in a regulating valve of this type, the moving element which serves to seal-off the enclosure is capable of displacement when the pressure within the enclosure exceeds a predetermined threshold value. The element accordingly moves from a first end position or bottom position in which it cooperates with the seating which is rigidly fixed to the vessel to a second end position or top position which is defined by a stop and in which said moving element is held away from said seating.

Regulating valves of the above-mentioned type which were designed prior to the present invention have a disadvantage in that they do not permit rapid upward displacement of the moving element to the top position when the pressure within the enclosure rises abruptly above the threshold value, thus entailing a potential danger of explosion of the enclosure.

Furthermore, regulating valves of this type do not lend themselves to a simple adjustment as a function of the pressure to be obtained within the enclosure.

The precise aim of the present invention is to provide a regulating valve which makes it possible to overcome the disadvantages stated in the foregoing.

The regulating valve with automatic release in accordance with the invention is of the type comprising a closure element adapted to move between a closed position in which it seals-off an opening formed in an enclosure and an open position in which it is withdrawn from said opening, means for exerting back-pressure on the closure element in order to maintain said element in its closed position when the pressure prevailing within the enclosure is lower than a given pressure. Said regulating valve is distinguished by the fact that the means for exerting back-pressure consist of a pneumatic jack which produces action on the closure element by means of a connecting system comprising coupling means which are capable of disconnecting the jack from the closure element in the event of a fast increase in the pressure which prevails within the enclosure.

The regulating valve which has the characteristic features outlined in the foregoing makes advantageous and profitable use of a pneumatic jack coupled with the moving element of the regulating valve by means of a mechanism for releasing said element in the event of fast variation in the difference between the pressures prevailing respectively within the enclosure and within the jack.

Thus the main advantage of the valve is to permit:

control of the displacements of the moving element by making it possible at each instant to carry out a suitable adjustment of the thrust exerted by the jack on said element;

a fast upward displacement of the moving element at the time of a sharp pressure rise within the enclosure, this being achieved as a result of uncoupling of the moving element and of the jack which constitutes an assembly having relatively high inertia;

adaptation of the displacement of the moving element to a wide range of rates of pressure rise within the enclosure;

maintaining of the enclosure in the depressurized state if necessary.

In accordance with the invention, the jack comprises an operating rod or so-called first rod extended by a sleeve in which is engaged one end of a second rod, the other end of which is rigidly fixed to the closure element. The coupling means comprise at least one ball housed within the wall of the sleeve and capable of engaging to a partial extent under the action of a calibrated spring within a groove formed in the second rod.

Moreover, each ball is preferably in contact with a push-rod which is guided in translational motion within a guide tube. One end of said guide tube is rigidly fixed to said sleeve whilst the other end is adapted to receive a screw which cooperates with a complementary screw-thread formed within the guide tube. The ends of said spring are applied respectively against said push-rod and against said screw.

In accordance with an advantageous arrangement of the invention, the regulating valve comprises a buffer storage tank connected on the one hand by means of a control valve to the zone of the jack cylinder which is delimited by the piston face remote from the closure element and, on the other hand, to a system for supplying compressed air at a given pressure.

When the ratio of respective volumes of the buffer storage tank and of the aforesaid jack zone is suitably chosen, the above-mentioned arrangement permits of suitable automatic adjustment of the thrust exerted by the jack.

In accordance with a further arrangement of the invention, those zones of the jack which are located on each side of the piston are connected to a buffer storage tank by means of a control valve for putting each zone into communication either with said storage tank or with the atmosphere, said buffer storage tank being connected to a system for supplying compressed air at a given pressure.

Furthermore, in accordance with one of the arrangements contemplated by the invention and mentioned in the foregoing, the jack cylinder zone delimited by that face of the piston which is remote from the closure element is connected to said buffer storage tank by means of a cock.

Thus the adjustment of the thrust exerted by the jack advantageously depends not only on the ratio of volumes of the buffer storage tank and of the jack but also on the pressure drop which is established across the cock and varies with the rate of pressure rise within the enclosure.

Further properties and advantages of the present invention will become more readily apparent from the following description of one exemplified embodiment which is given by way of illustration but not in any limiting sense and relates to a regulating valve in accordance with the invention.

BRIEF DESCRIPTION OF THE DRAWING

The following description will be given with reference to the single accompanying diagrammatic FIGURE in which one embodiment of a valve according to the invention is shown in vertical cross-section.

DETAILED DESCRIPTION OF THE PREFERRED EMBODIMENT

It can be seen in FIG. 1 that the regulating valve comprises a valve disc 2 for closing in leak-tight manner an opening 6 formed in a pressure vessel or enclosure 4. Said enclosure contains a fluid under a pressure which must not exceed a predetermined threshold value.

To this end, said valve disc 2 is capable of displacement under the action of the pressure of the fluid within the enclosure 4 between a bottom position in which it seals-off the opening 6 of the enclosure 4 and cooperates by means of an O-ring seal 8 with a valve seating 10 carried by an annular member 12 which is rigidly fixed to the enclosure 4, and a top position in which said valve disc is arrested by three stops such as the stop 14.

In more precise terms, said valve disc 2 is attached at one end to a rod 16, the other end of which is engaged within the bore 13 of a sleeve 18 which is rigidly fixed to the operating rod 20 of a pneumatic jack 22. The end of the rod 16 is coupled for translational displacement with the sleeve 18 by disconnectable coupling means which will be described hereinafter.

It is observed in the accompanying figure that the pneumatic jack 22 is supported by a plate 24 mounted on three columns such as the column 26 and that each stop 14 is constituted by a threaded annular member which is intended to cooperate with a complementary screw-thread formed on each column 26, the stop 14 being maintained in a given position by means of a nut 28. By virtue of this arrangement, it is an easy matter to adjust the position of each stop 14 and consequently the length of the maximum range of travel of the valve disc 2.

The head 19 of the sleeve 18 is rigidly fixed to the operating rod 20 of the pneumatic jack 22 in the following manner: the head 19 is provided with an internally threaded recess 19a which is adapted to cooperate with a complementary screw-thread 20a formed on the end of the rod 20. This arrangement makes it possible to adjust the distance between the plate 24 and the head 19 of the sleeve 18, this distance being intended to be either equal to or greater than the maximum range of travel of the valve disc 2. It is readily apparent that the distance between the free end of the rod 16 and the bottom of the bore 13 is greater than the maximum range of travel of the valve disc 2 as a function of the position of the stop 14.

It is noted that the disconnectable coupling means provided between the rod 16 and the sleeve 18 comprise three balls such as the ball 30 which are spaced at angular intervals of 120° about the axis of the sleeve 18. Each ball 30 is housed within the wall of the sleeve 18 and is capable of engaging to a partial extent under the action of a calibrated spring 32 within a groove 34 of complementary shape which is formed in the rod 16.

More specifically, the calibrated spring 32 is applied to one end against a push-rod 35 which is in contact with the ball 30, said push-rod being guided in translational motion within a guide tube 36 which is rigidly fixed to the sleeve 18. At the other end, the spring 32 is applied against an adjusting screw 38 which is adapted to cooperate with a complementary screw-thread formed within the guide tube 36, said screw 38 being locked in position by means of a nut 40.

It is apparent from the accompanying figure that, in accordance with one of the characteristic features of the invention, the zones A and B of the jack 22 located on each side of the piston 22p are connected to each other by means of pipes 42a and 42b, a control valve 44 and a cock 45 to a buffer storage tank 46, said tank being supplied with compressed air at a predetermined pressure which can be adjusted by means of an expansion valve 48. The control valve 44 serves to put each zone A and B of the jack into communication with the tank 46 or with the external atmosphere and the cock 45 makes it possible to adjust the pressure drop of the fluid which flows between the jack and the tank 46.

It will also be noted in the figure that a protective bellows element 42 is secured to the support plate 24 and to the head 19 of the sleeve 18 and that a second protective bellows element 42' is secured to the free end of the sleeve 18 and of the valve disc 2.

The mode of operation of the regulating valve shown in the accompanying figure will now be explained.

There is initially established within the zone A of the jack 22 a pressure of compressed air such that the jack exerts on the valve disc 2 a back-pressure which balances a predetermined pressure of the fluid contained within the enclosure and corresponding to a threshold value which must not be exceeded. Adjustment of this back-pressure exerted by the jack for determining the pressure threshold not to be exceeded within the enclosure is performed by means of the expansion valve 48.

An adjustment is also carried out on the rate of increase in fluid pressure above which the coupling means provided between the rod 16 and the sleeve 18 are intended to disengage the jack 22 from the valve disc 2. This adjustment is performed on the one hand by restricting the communication between the zone A of the jack and the storage tank 46 to a greater or lesser extent by means of the cock 45 in such a manner as to define a given pressure drop between these latter and, on the other hand, by compressing the balls 30 to a greater or lesser extent by means of the adjusting screws 38.

When the pressure within the enclosure is below the predetermined threshold value as a result of the back-pressure exerted on the valve disc 2 by the valve 22, the valve disc is tightly applied against its seating 10.

At the time of an increase in pressure within the enclosure, the difference between the opposing forces exerted on the valve disc 2 by the jack 22 and by the fluid contained within the enclosure 4 decreases to zero when these forces are balanced. When the pressure existing within the enclosure becomes higher than the pressure threshold determined beforehand by means of the expansion valve 48, the valve disc is lifted from its seating and thus performs the regulation.

When the pressure rises within the enclosure at a low rate, opening of the regulating valve is sufficient to stabilize or to reduce the pressure within the enclosure immediately, with the result that the force exerted on the valve disc 2 by the fluid contained within the enclosure remains close in value to the force exerted by the jack on the valve disc 2 through the balls 30 which cooperate with the groove 34; this last-mentioned force increases only to a very slight extent by reason of the small influence of the pressure drop defined by the cock 45 when the displacement of the piston 22p within the jack cylinder takes place at low speed. In consequence, the opposing forces exerted on the balls 30 are insufficient to urge these latter out of the groove 34 in opposition to the force exerted by the springs 32. The assembly constituted by the valve disc 2, the sleeve 18 and the operating rod 20 then undergoes an upward displacement in order to perform the regulation.

At the time of a rapid pressure rise within the enclosure, opening of the regulating valve is not sufficient to produce an instantaneous reduction of the pressure rise. The force exerted on the valve disc 2 by the fluid contained within the enclosure therefore causes a rapid upward displacement of the assembly shown in the figure and constituted by the valve disc 2, the sleeve 18 and the operating rod 20. By reason of the pressure drop defined by the cock 45, this consequently produces an abrupt increase in the pressure which prevails within the zone A of the jack. In consequence, the two opposing forces which produce action on the balls 30 rapidly become very large and urge these latter out of the groove 34 in opposition to the force exerted by the spring 32. The rod 16 which is rigidly fixed to the valve disc 2 is then disengaged from the operating rod 20 of the jack 22 and the valve disc 2 moves upwards rapidly to the stops 14 under the action of the pressure existing within the enclosure.

It is pointed out that the diameter of the valve disc 2 is determined as a function of the maximum pressure drop which may be established through the opening 6 in the case of a reference type of accident which is liable to occur within the enclosure or pressure vessel.

After a fast pressure rise within the enclosure which results in uncoupling of the rods 16 and 20, it is possible:

either to leave the system as it stands and in the state in which the enclosure remains depressurized;

or to recouple the rods 16 and 20 in order to put the jack zones B and A successively in communication with the buffer storage tank, first of all in order to displace the sleeve 18 upwards, then in order to re-engage the balls 30 within their grooves 34, and then to lower the operating rod 20 of the jack, thus again ensuring leaktight closure of the pressure vessel.

It is pointed out that the sleeve 18 could be lifted by providing a supply of complementary air through the expansion valve 48. It is worthy of note, however, that recoupling of the rods 16 and 20 as shown in the figure by means of the air contained in the buffer storage tank 46 produces a reduction in pressure within this latter and within the jack zone A, thus in turn lowering the limiting pressure threshold within the enclosure and consequently raising the standard of operational safety.

This possibility is particularly advantageous in all cases in which an accident occurring within the enclosure or pressure vessel is liable to result in complete and simultaneous destruction of the compressed-air and electrical installations. Steps must be taken in such a case either for hand operation of the control valve 44 or for mechanical operation of this latter by means of end-of-travel stops (not shown in the drawings) which come into contact with the valve disc 2.

We claim:

1. A regulating valve with automatic release comprising:

a closure element movable between a closed position in which it seals off an opening in an enclosure and an open position in which it is withdrawn from said opening;

said closure element having a first face facing the inside of said enclosure and a second face; the pressure within said enclosure exerting a first force on said first face of said closure element;

regulating means for generating a given back-pressure to exert a second force on said closure element at said second face so as to maintain said closure element in said closed position when said second force exceeds said first force, said first force causing said closure element to move to said open position when said first force exceeds said second force; and means for detachably coupling said closure element to said regulating means including a pneumatic jack having an operating rod, and means mounted for movement with said rod for engaging said closure element in the absence of a rapid increase in the pressure prevailing within said enclosure and disengaging said jack from said closure element in response to a rapid increase in the pressure prevailing within the enclosure whereby said first force exceeds said second force, to permit said closure element to move to said open position in response to said rapid pressure increase.

2. A regulating valve as claimed in claim 1, wherein said connecting system includes a sleeve and a second rod having two ends and a groove;

said operating rod of said jack being extended by said sleeve, said sleeve engaging one of said two ends of said second rod, the other end of said second rod being rigidly fixed to said enclosure element;

said coupling means comprising at least one ball housed within the wall of said sleeve, and a calibrated spring, said ball normally partially engaging said second rod within said groove under the action of said calibrated spring.

3. A regulating valve as in claim 2 wherein said coupling means further comprises a screw, a guide tube rigidly fixed at one end thereof to said sleeve, and a push-rod slidably disposed in said guide tube;

the other end of said guide tube being threaded for receiving said screw;

said calibrating spring having two ends respectively contacting said screw and one end of said push rod to urge the other end of said push rod into contact with said ball.

4. A regulatory valve as in claim 1, further comprising a buffer storage tank and a control valve, said pneumatic jack including a cylinder and a piston reciprocally movable therein so as to define two zones in said cylinder including a jack cylinder zone remote from said closure element, said buffer storage tank communicating with said jack cylinder zone via said control valve, said regulatory valve further comprising means for supplying compressed air at a given pressure, said buffer storage tank further communicating with said air supplying means.

5. A regulating valve as claimed in claim 4, further comprising a cock, the jack cylinder zone which is remote from said closure element communicating with said buffer storage tank via said cock.

6. A regulatory valve as in claim 1, further comprising a buffer storage tank, a control valve disposable in either of two positions, and means for supplying compressed air at a given pressure;

said jack including a cylinder and a piston reciprocally movably disposed in said cylinder so as to define two zones within said cylinder;

one of said two zones communicating with said buffer storage tank via said control valve and the other zone communicating with the outside atmosphere via said control valve, when said control valve is disposed in one of said two positions;

whereby said one zone and said other zone may be reversed with respect to their communication with the outside atmosphere and said buffer storage tank by disposing said control valve in the other of said two positions;

said buffer storage tank communicating with said air supplying means.

* * * * *